United States Patent [19]

Neubauer et al.

[11] Patent Number: 5,997,432
[45] Date of Patent: Dec. 7, 1999

[54] AUTOMATED TRANSMISSION FOR USE IN POWER TRAINS OF MOTOR VEHICLES

[75] Inventors: Dirk Neubauer, Nachrodt-Wiblingwerde; Dirk Heintzen, Hagen, both of Germany

[73] Assignee: AFT Atlas Fahrzeugtechnik, Werdhol, Germany

[21] Appl. No.: 09/060,014

[22] Filed: Apr. 14, 1998

[30] Foreign Application Priority Data

Apr. 18, 1997 [DE] Germany .......................... 197 16 285

[51] Int. Cl.$^6$ .................................................. F16H 61/28
[52] U.S. Cl. .................................................. 477/88; 74/335
[58] Field of Search ................... 74/335, 336 R; 477/88

[56] References Cited

U.S. PATENT DOCUMENTS

| Re. 20,794 | 7/1938 | Hill et al. ................................... 477/88 |
| 2,153,509 | 4/1939 | Rockwell ............................... 477/88 X |
| 2,478,058 | 8/1949 | Schantz ................................... 477/88 |
| 2,917,141 | 12/1959 | Neracher et al. ......................... 477/88 |
| 3,035,676 | 5/1962 | Nallinger ................................. 477/88 |
| 3,327,817 | 6/1967 | Ivanchich ................................ 477/88 |
| 4,234,066 | 11/1980 | Toyota et al. ........................ 477/88 X |
| 4,821,607 | 4/1989 | Kawai ................................. 74/336 R X |
| 4,841,793 | 6/1989 | Leigh Monstevens et al. .......... 74/335 |
| 4,911,031 | 3/1990 | Yoshimura et al. ....................... 74/335 |
| 4,938,088 | 7/1990 | Langley et al. ........................... 74/335 |
| 5,205,179 | 4/1993 | Schneider ............................... 74/335 X |
| 5,219,391 | 6/1993 | Edelen et al. ............................. 74/335 |
| 5,239,894 | 8/1993 | Oikawa et al. ....................... 74/335 X |
| 5,239,897 | 8/1993 | Zaiser et al. ............................... 74/335 |
| 5,281,902 | 1/1994 | Edelen et al. ........................ 74/335 X |
| 5,450,934 | 9/1995 | Maucher . |
| 5,689,997 | 11/1997 | Schaller ................................... 74/335 |
| 5,823,053 | 10/1998 | Stengel et al. ............................ 74/335 |

FOREIGN PATENT DOCUMENTS 43 20 353 A 1   1/1994   Germany .

*Primary Examiner*—Khoi Q. Ta
*Attorney, Agent, or Firm*—Darby & Darby

[57] ABSTRACT

An arrangement which operates an automated transmission for use in the power train of a motor vehicle has an element which can transmit motion to a gear selecting and shifting member of the transmission. The element is reciprocable by a first actuator which can employ an electric and/or fluid-operated and/or mechanical drive and is responsive to signals from an electronic control unit. A second signal-responsive actuator can be utilized to index the gear selecting and shifting member, either directly or by way of the motion transmitting element, in order to actually shift into or from a selected gear and/or to cause the member and/or the element to bypass an obstacle which can arrest the member and/or the element in an intermediate position in order to shift into or from one or more gears in certain types of transmissions.

45 Claims, 5 Drawing Sheets

AUTOMATED TRANSMISSION FOR USE IN POWER TRAINS OF MOTOR VEHICLES

BACKGROUND OF THE INVENTION

The present invention relates to transmissions for use in the power trains of motor vehicles, and more particularly to improvements in so-called automated transmissions which can be shifted into or from selected (such as neutral, reverse and forward) gears by so-called actuators in response to signals from one or more control units. As used herein, the term actuator is intended to denote a device which performs an action or outputs a signal in response to a signal from a computer or another suitable control unit. Still more particularly, the invention relates to improvements in automated transmissions wherein a gear selecting and/or shifting member (e.g., a rotary and axially movable member) receives or can receive motion from an axially shiftable output element of an actuator.

The power train of a motor vehicle normally comprises a prime mover (such as an internal combustion engine or a hybrid unit including a motor and a combustion engine), and a transmission which is installed in the power flow from the output element (such as a crankshaft or a camshaft) of the prime mover to the driven wheel or wheels of the motor vehicle. The transmission is shiftable into different gears to thus select the direction and/or the speed of movement of the vehicle. In other words, the transmission can establish a desired relationship between one or more prime mover parameters (such as the RPM of a rotary output element of an internal combustion engine) and one or more parameters (such as the speed and/or the direction of movement) of the motor vehicle. The ratio of the transmission can be changed by hand (e.g., by way of a conventional gear selecting and shifting lever) or automatically (e.g., by the aforementioned control unit and one or more actuators). For example, a manual or automated transmission can be shifted into neutral, into at least one reverse gear, and into one or more (e.g., an infinite number of) forward gears.

A manually engageable and disengageable or an automated torque transmitting system (such as a friction clutch) can be installed between the prime mover and the transmission or downstream of the transmission.

An automated transmission is disclosed, for example, in published German patent application Serial No. 43 20 353. This automated transmission can be operated by resorting to a source of a pressurized fluid medium, and its drawback is that the power train embodying such transmission cannot be caused to shift from normal operation to an emergency mode when the source of pressurized fluid is damaged or totally out of commission for whatever reason or reasons. The same holds true if actuators between a control unit and the automated transmission of the character disclosed in the aforementioned published German patent application become defective or totally disabled. The result is that the transmission cannot be shifted from a previously selected gear into a different gear, e.g., from reverse gear or a forward gear into neutral.

OBJECTS OF THE INVENTION

An object of the invention is to provide an automated transmission which can be caused to shift into a desired gear even if its actuator or actuators is or are at least partly defective or totally ineffective.

Another object of the invention is to provide an automated transmission with a novel and improved connection between one or more actuators and the gear selecting and shifting member or members.

A further object of the invention is to provide an automated transmission which can be rapidly and reliably shifted into or from a selected gear or ratio.

An additional object of the invention is to provide an automated transmission which can be rapidly and reliably shifted into or from a selected gear with one or more actuators relying on one or more energy sources which are normally available in a motor vehicle.

Still another object of the invention is to provide an automated transmission which can be operated with the expenditure of small quantities of available energy or of energy supplied by one or more specifically provided compact and inexpensive sources.

A further object of the invention is to provide a power train which employs an automated transmission of the above outlined character.

Another object of the invention is to provide a motor vehicle embodying a power train which employs a novel automated transmission of the above outlined character.

An additional object of the invention is to provide a novel and improved method of assembling, installing and operating an automated transmission in the power train of a motor vehicle.

SUMMARY OF THE INVENTION

One feature of the present invention resides in the provision of an apparatus for operating a mobile condition changing member (e.g., a reciprocable and indexible shaft or rod) of an automated transmission, particularly a transmission which can be utilized in the power train of a motor vehicle (e.g., between an internal combustion engine and a differential). The improved apparatus comprises at least one actuator which serves to move the condition changing member in response to signals from at least one control unit (e.g., a computer), and the at least one actuator comprises a motion transmitting element which is operatively connected with (e.g., directly or indirectly coupled to) the condition changing member and is movable back and forth along a predetermined path. The at least one actuator further comprises energy storing means for biasing the motion transmitting element to at least one predetermined position in which the condition changing member causes the transmission to assume a first condition, and fluid operated means for moving the motion transmitting element from the predetermined position to at least one second position in which the condition changing member causes the transmission to assume a second condition. The fluid operated means comprises at least one fluid-containing chamber and means for varying the pressure of fluid (e.g., air) in the chamber to thus effect a movement of the motion transmitting element to the at least one second position.

The path for the motion transmitting element is or can be an at least substantially straight path, and the energy storing means can comprise one or more coil springs or other suitable resilient energy storing components.

The at least one chamber can constitute a plenum chamber (wherein the fluid is or can be maintained at superatmospheric pressure) and the energy storing means can comprise at least one energy storing component which can but need not always be confined in the plenum chamber.

As a rule, the transmission is shiftable into a selected one of a plurality of different gears (such as neutral, at least one reverse and two or more forward gears), and the condition changing member can be designed and mounted and operated to carry out at least one of condition changing operations including (a) selecting a gear and (b) shifting into and from a selected gear.

The arrangement can be such that the motion transmitting element is movable along its path between two end positions and that the energy storing means is arranged to bias such element to one of its end positions. The one end position can but need not coincide with the aforementioned predetermined position of the motion transmitting element. For example, the predetermined position can be located between the two end positions, and the energy storing means can comprise at least one first and at least one second spring. Such springs are arranged to apply to the motion transmitting element forces which at least substantially neutralize (i.e., balance) each other in the predetermined position of the motion transmitting element.

The at least one chamber can constitute an annular chamber which surrounds a spring (e.g., a coil spring) of the energy storing means.

In accordance with one presently preferred embodiment of the invention, the fluid operated means of the at least one actuator comprises a first and a second fluid-containing chamber and means for regulating the pressure of fluid in at least one of the first and second chambers to thus effect a movement of the motion transmitting element to a selected one of a plurality of second positions. The fluid operated means can be set up to operate in such a way that it effects a movement of the motion transmitting element from the predetermined position, along the predetermined path, and in a first direction against the opposition of the energy storing means as well as of fluid in the second chamber in response to a rise of fluid pressure in the first chamber, or to effect a movement of the motion transmitting element from it predetermined position, along its predetermined path, and in a second direction against the opposition of the energy storing means and of fluid pressure in the first chamber in response to a rise of fluid pressure in the second chamber.

The fluid operated means can further comprise a displaceable partition which seals the first and second chambers from each other and is connected with the motion transmitting element; such partition can include or constitute a deformable diaphragm.

Alternatively, the fluid operated means can further comprise a displaceable sealing wall for each of the two chambers, and each such wall has a portion secured to the motion transmitting element. At least one of these walls can include or constitute a deformable diaphragm.

The aforementioned fluid pressure regulating means can comprise at least one suction generating device and means for selectively connecting such device with the two chambers, i.e., with the first chamber and/or with the second chamber.

Alternatively, the fluid pressure regulating means can comprise means for raising the pressure of fluid in at least one of the chambers to a pressure which is above atmospheric pressure. The arrangement can be such that the fluid pressure regulating means includes means for raising the pressure of fluid in one of the chambers above atmospheric pressure and means for lowering the pressure of fluid in the other chamber below atmospheric pressure.

Still further, the fluid pressure regulating means can include means for at least temporarily maintaining the fluid in one of the chambers at a pressure which at least approximates atmospheric pressure, and for at least temporarily maintaining the fluid in the other chamber at a pressure other than (i.e., above or below) atmospheric pressure.

It is also possible to design the fluid pressure regulating means in such a way that it permanently maintains the pressure of fluid in one of the chambers at least close to atmospheric pressure.

The fluid operated means can comprise a housing including first and second walls respectively bounding portions of the first and second chambers, at least one first diaphragm which cooperates with the first wall to define the first chamber, and at least one second diaphragm cooperating with the second wall to define the second chamber. Such fluid operated means can further comprise first and second supporting members for the first and second diaphragms, respectively, and each of these supporting members is operatively (e.g., directly) connected with the motion transmitting element. The energy storing means of such actuator can comprise at least one spring which is provided in one of the chambers and bears against the respective supporting member.

Alternatively, the fluid operated means can further comprise a housing including a wall bounding a portion of the first chamber, at least one first diaphragm cooperating with such wall to define the first chamber, a second diaphragm bounding a portion of the second chamber, and a second wall which is borne by and is received in the housing and cooperates with the second diaphragm to define the second chamber.

At least one of the chambers can be designed in such a way that it is at least substantially dynamically balanced. Furthermore, at least one of the chambers can have an at least substantially circular shape.

The energy storing means can comprise at least one spring which is provided in one of the chambers and serves to bias the motion transmitting element to the predetermined position.

Another feature of the invention resides in the provision of a transmission which is shiftable into and from a selected one of a plurality of different gears. The transmission comprises a gear selecting and shifting member which is movable back and forth in a predetermined direction along a first path and includes a first lateral projection having a first width (as measured in the predetermined direction), and means for moving the gear selecting and shifting member along the first path. The moving means includes a motion transmitting element which is movable back and forth along a second path (such second path can be parallel to the first path), which includes a second lateral projection, and which is indexible between first and second angular positions. The second projection has a second width (again as measured in the predetermined direction); such second projection is aligned with the first projection in the first angular position of the motion transmitting element, and the moving means further comprises mans for moving the motion transmitting element along the second path between two end positions through a distance which at least approximates the combined width of the two projections.

The transmission further comprises means for indexing the motion transmitting element, and such indexing means can comprise an electric motor and at least one gearing operatively connecting an output element of the motor with the motion transmitting element.

Alternatively, the indexing means can comprise at least one magnet; such indexing means can further employ at least one gearing connecting the at least one magnet with the motion transmitting element.

It is also possible to employ indexing means which includes at least one suction-operated actuator; such indexing means can further comprise at least one gearing connecting the actuator with the motion transmitting element.

Still further, the transmission can comprise at least one bearing which rotatably supports the motion transmitting element for (reciprocatory and angular) movement along the second path.

Such transmission can also comprise means for confining the motion transmitting element to movement through the aforementioned distance (matching or approximating the combined width of the two projections), and the confining means can comprise at least one resilient stop.

A further feature of the invention resides in the provision of a transmission which is shiftable into and from a selected one of a plurality of different gears. The transmission comprises a gear selecting and shifting member and such member is indexible about a predetermined axis, and means for indexing the gear selecting and shifting member. The indexing means comprises a first indexing element which is movable from a first position to a plurality of different second positions, means for moving the first element between such positions, a second indexing element which is movable with the gear selecting and shifting member, and resilient means arranged to subject the second indexing element to the action of an increasing force in response to movement of the first indexing element from the first position.

The resilient means can comprise at least one torsion spring.

The two indexing elements are or can be turnable about a common axis.

The means for moving the first indexing element can comprise a motor, e.g., an electric motor.

The first and second indexing elements can comprise first and second extensions which are at least substantially parallel to their common axis and are biased by the resilient means. Such resilient means can comprise at least one convolution which surrounds the common axis, and first and second end portions which respectively bear upon the first and second extensions. The two extensions can be disposed at different radial distances from the common axis of the indexing elements, and such transmission can further comprise at least one bearing which rotatably mounts at least one of the indexing elements for angular movement with and relative to the other indexing element about the common axis.

At least one of the indexing elements can comprise a plurality of first locking devices (e.g., a set of suitably distributed recesses or sockets) each of which is engageable with a second locking device in different positions of the at least one indexing element. The second locking device can comprise a tooth or another suitable protuberance which can be caused to enter a selected first locking device. Such second locking device can be arranged for movement under the action of a suitable actuator which serves to engage the second locking device with and to disengage the second locking device from a selected first locking device. This actuator can comprise a magnet, an electric motor or another suitable arrangement for moving the second locking device.

The novel features which are considered as characteristic of the invention are set forth in particular in the appended claims. The improved transmission and the operating means themselves, however, both as to their construction and their modes of operation, together with numerous additional novel and advantageous features and attributes thereof, will be best understood upon perusal of the following detailed description of certain presently preferred specific embodiments when interpreted in conjunction with the accompanying drawings.

BRIEF DESCRIPTION OF THE DRAWINGS

FIG. 5b is an exploded view of a portion of the structure which is shown in FIG. 5a.

DESCRIPTION OF PREFERRED EMBODIMENTS

Figure 1:
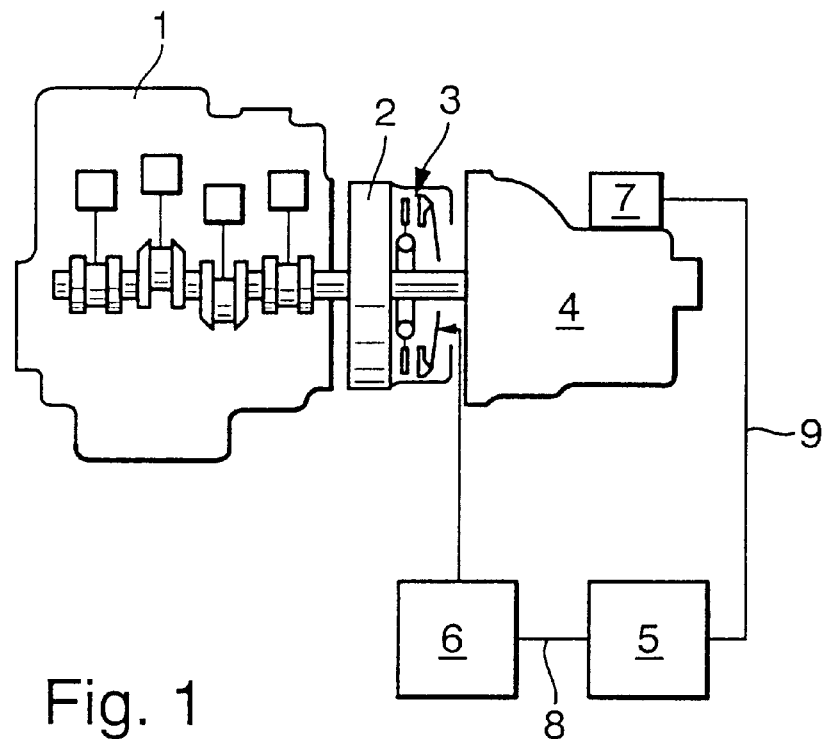
FIG. 1 is a schematic elevational view of a power train adapted to be utilized in a motor vehicle an including an automated transmission which can be constructed, assembled and operated in accordance with the present invention.

FIG. 1 shows certain component parts of a power train for use in a motor vehicle. The power train comprises a prime mover (e.g., an internal combustion engine or a hybrid unit employing a motor and a combustion engine) having a rotary output element carrying a flywheel 2 which forms part of an automated torque transmitting system 3 (e.g., a self-adjusting friction clutch of the type disclosed in commonly owned U.S. Pat. No. 5,450,934 granted Sep. 5, 1995 to Maucher for "FRICTION CLUTCH"), and an automated transmission 4 which receives torque from an output element (such as a clutch disc or clutch plate) of the torque transmitting system 3. The output element of the transmission 4 can drive the input element of a differential (not shown) which, in turn, can transmit motion to the axle or axles for the driven wheel or wheels of the motor vehicle.

The power train of FIG. 1 further comprises a control unit 5 which receives signals from one or more sensors and/or electronic circuits (e.g., an electronic engine circuit), which processes some or all of the thus received signals, and which transmits processed signals to an actuator 6 for the automated torque transmitting system 3 as well as to an actuator 7 for the automated transmission 4. The signal transmitting connections (such as cables and/or buses) between the control unit 5 and the actuators 6, 7 are shown at 8 and 9, respectively. The means for operating the torque transmitting system 3 in response to signals from the control unit 5 can comprise several actors (6), and the means for operating the automated transmission 4 in response to signals from the control unit 5 can also comprise several actuators (7).

The actuator 7 transmits motion to a suitable gear selecting and shifting member (see the member 160 in FIG. 2) of the transmission 4. Several modes of cooperation between an actuator and a gear selecting and shifting member will be described with reference to FIGS. 2, 3, 4a to 4d and 5a–5b.

Figure 1A:
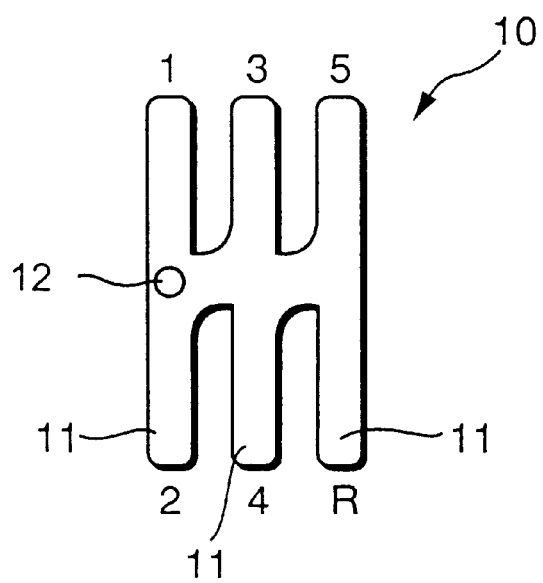
FIG. 1a is a schematic plan view of a gear shifting gate adapted to be utilized in an automated transmission embodying the invention.

FIG. 1a shows a gear selecting or shifting setup (also called gear shifting gate) 10 which can be utilized in the automated transmission 4 of FIG. 1. The transmission is assumed to be shiftable into neutral, into reverse gear (R), and into any one of five forward gears (1 to 5). The reference characters 11 denote paths for movements of the aforementioned gear selecting and shifting member from a selected gear (1–5, R) into neutral, or vice versa, or from one of the gears 1–5, R into any other of these gears.

The gear selecting and shifting member can be confined in the housing or case of the transmission 4, or it can extend from the case. Such member can include or constitute at least one central gear selecting/shifting shaft or a set of rods serving to select particular gear ratios and to shift into or from the corresponding gears. The means for moving the gear selecting/shifting member of the transmission 4 comprises a reciprocable motion transmitting element of the actuator 7 (see the element 102 of FIG. 2). A presently preferred automated transmission can be designed in such a way that its indexible (i.e., rotary) and axially movable central shaft is indexed into and from a selected gear and is moved axially to select a particular gear (such as the forward gear 1 or 2, the forward gear 3 or 4, or the forward gear 5 and the reverse gear R shown in FIG. 1a). The neutral to position of the gear selecting/shifting member in the gate 10 of FIG. 1a is shown at 12.

It is further within the purview of the invention to design the gear selecting/shifting member in such a way that the member moves axially in order to shift into or from a desired gear, and that such member is indexed in order to select a desired gear.

Still further, and as already mentioned above, the means which selects and shifts into and from selected gears can include two or ore components (such as rods) which replace a one-piece indexible and axially movable member and are arranged to perform axial and/or angular movements.

A joint between the motion transmitting (output) element of the actuator (such as 7) and the gear selecting/shifting member can be designed in such a way that an axial movement of the motion transmitting element results in an axial and/or angular movement of the gear selecting/shifting member.

Figure 2:
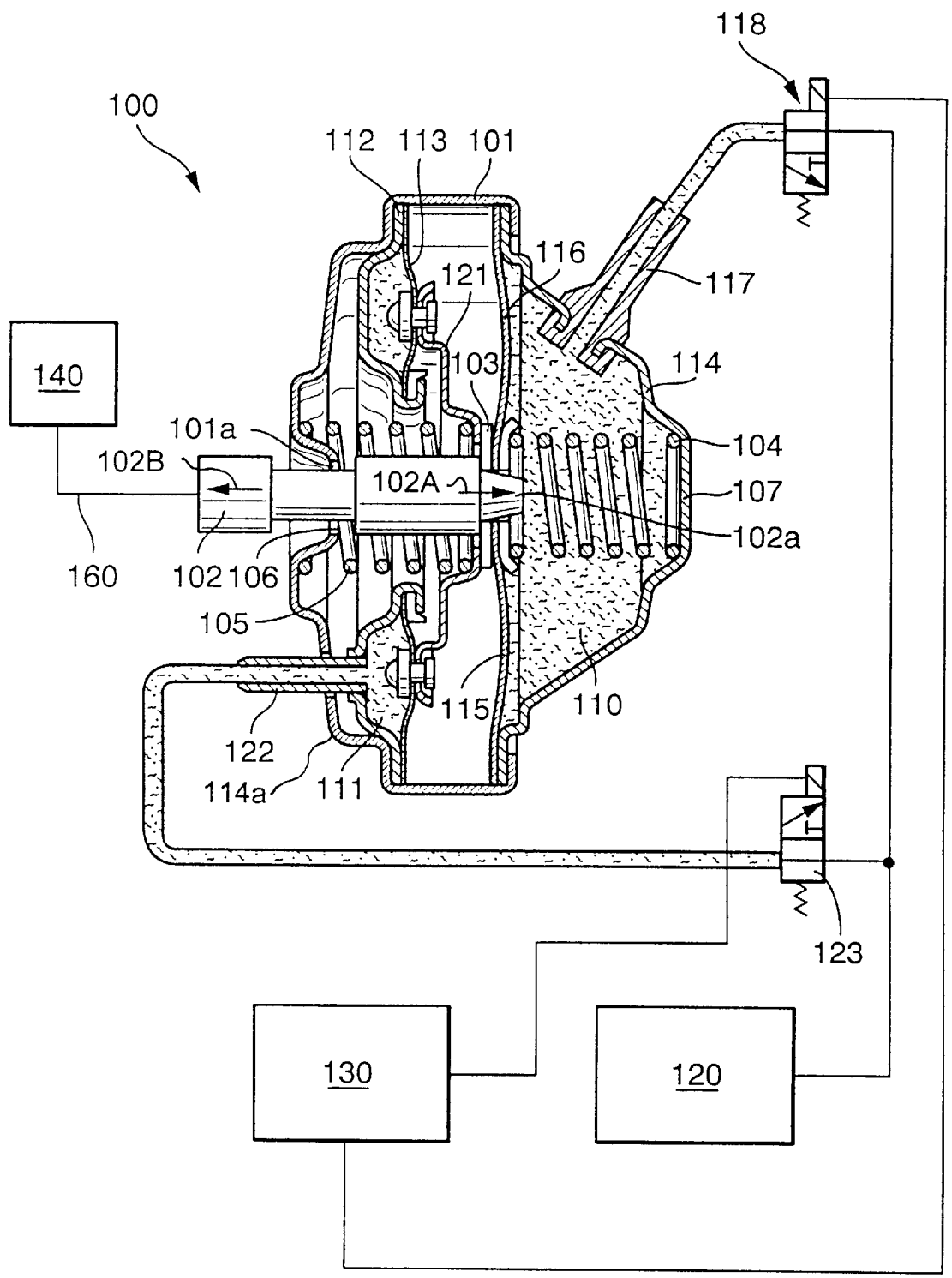
FIG. 2 is a diagrammatic partly elevational and partly sectional view of certain parts of a power train including one embodiment of a novel automated transmission and of an actuator for the gear selecting and shifting member of the transmission.

FIG. 2 shows an actuator 100 which can be utilized (at 7) in the power train of FIG. 1 to automatically move the reciprocatory and/or turnable (indexible) and/or pivotable gear selecting/shifting member 160 of the automated transmission 140 in response to movements of a motion transmitting (output) element 102 along a straight path in the direction indicated by an arrow 102A or in the direction indicated by an arrow 102B. The member 160 extends from the case of the transmission 140 and can transmit motion to one or more internal components of the transmission, such as are necessary to ensure that the axial movements of the member 102 will bring about an appropriate selection of a particular gear and/or a shifting into or from a given gear.

The actuator 100 of FIG. 2 further comprises a circular housing or casing 101 which includes two confronting walls 114, 114a. The wall 114 bounds a portion of a circular chamber 114 (e.g., a plenum chamber) and cooperates with a partition or sealing wall 115 here shown as a resiliently deformable diaphragm. The radially outer portion of the diaphragm 115 is sealingly affixed to the adjacent portion of the housing 101, and the radially inner portion of this diaphragm is operatively connected (at 103) with the adjacent end portion 102a of the reciprocable element 102 by a washer-like diaphragm supporting member 116 and a coil spring 104 forming part of a composite energy storing means 104, 105 and being confined in a body of fluid (such as oil or air) in the chamber 110. The coil spring 104 reacts against a recessed central portion 107 of the wall 114 and bears upon the supporting member 116 in order to permanently urge the central portion of the diaphragm 115 against the conical surface of the end portion 102a of the element 102.

An annular second chamber 111 (e.g., a plenum chamber) is defined by a second deformable diaphragm 113 and a washer-like wall 112 which is confined in the housing 101 and is borne by the wall 114a. The central portion of the diaphragm 113 is riveted to a rigid supporting member 121 which is biased against the central portion of the diaphragm 115 by the coil spring 105 in the housing 101.

The wall 114a of the housing 101 has a central opening 101a for the motion transmitting element 102.

The housing 101, the chambers 110, 111 and the diaphragms 113, 115 form part of a fluid operated means for changing the axial position of the element 102 from the illustrated neutral or predetermined position. The element 102 is urged to such position by the coil springs 104, 105 whose forces neutralize each other in the illustrated axial position of the element 102 (it being assumed here that the forces of the coil springs 104, 105 are not assisted or opposed by the pressure of fluid in the chambers 110, 111).

The axis of the housing 101 preferably coincides with that of the reciprocable motion transmitting element 102. The coil spring 105 is coaxial with and surrounds the element 102 and is, in turn, spacedly surrounded by the annular diaphragm 113 and chamber 111.

The means for varying the pressure of fluid in the chambers 110, 111 comprises a control unit 130, a suction generating device 120 which can receive some fluid from the chamber 110 by way of a conduit 117, or some fluid from the chamber 111 by way of a conduit 122, a first valve 118 in the conduit 117, and a second valve 123 in the conduit 122. The valves 118, 123 are responsive to signals from the control unit 130. For example, the just described means for varying the fluid pressure in the chambers 110, 111 can employ electromagnetic valves of any known design.

The housing 101 can be assembled of several parts made (from a metallic sheet material) in a deep drawing machine, or it can be made of a suitable plastic material. This housing preferably constitutes a dynamically balanced box. The parts (112, 113, 121) which define and support the chamber 111 preferably also constitute a dynamically balanced structure.

The spring 105 reacts against the central portion 106 of the housing 101 and indirectly bears against the diaphragm 113 by way of the supporting member 121 which is thereby urged against the central portion of the diaphragm 115. The dimensions of the central opening 101a are preferably such that the wall 114a can limit the extent of axial movability of the element 102 between two end positions flanking the predetermined axial position which is shown in FIG. 2. The central portion 106 of the wall 114a extends axially of the housing 101 toward the central portion 107 of the wall 114 and is preferably dimensioned in such a way that its central part extends into the adjacent end convolution(s) of the coil spring 105.

The radially outer portion of the diaphragm 115 can be glued, welded or otherwise sealingly or practically sealingly secured to the adjacent portion of the housing 101.

The axial position of the central portion of the diaphragm 115 and of the supporting member 121 for the diaphragm 113 (i.e., the axial position of the element 102) can be changed (selected) by appropriate selection of superatmospheric or subatmospheric pressure in the chamber 110 and/or 111. Thus, the pressure of fluid in the chamber 110 is changed by the device 120 in response to signals from the control unit 130 (to the valve 118 in the conduit 117), and this entails an axial displacement and deformation of the diaphragm 115. If the valve 118 is set to enable the device 120 to draw fluid from the chamber 110 (via conduit 117), the element 102 is caused to move axially in the direction which is indicated by the arrow 102A because the bias of the spring 104 is opposed by the tendency of the central portion of the diaphragm 115 to move to the right under the bias of the spring 105 and the developing altered difference of pressures at the opposite sides of the diaphragm 115.

The device 120 can be provided in the motor vehicle as a component part of the actuator 110, e.g., a pump, an accumulator or a vacuum chamber. Alternatively, such device can constitute a standard component of the motor vehicle, e.g., a part of the braking system or a part of the means for reducing the pressure in the suction manifold of the combustion engine.

The wall 112 can constitute a portion of the housing 101 (i.e., of the wall 114a). The illustrated wall 112 is a separately produced annular part which is welded, otherwise bonded or riveted to the adjacent portion of the housing 101. As can be seen in FIG. 2, the configuration of the wall 112 is such that it can sealingly engage the radially innermost and radially outermost portions of the washer-like diaphragm 111; for example, the diaphragm 111 can be glued or otherwise bonded to the wall 112. The radially outer portion of the supporting member 121 can be glued, otherwise bonded, riveted, screwed or otherwise reliably secured to the median portion of the diaphragm 111.

If the control unit 130 is caused to actuate the valve 123 in such a way that some of the fluid is compelled to flow from the chamber 111 to the device 120 (such device constitutes or then acts as a suction generating means), the spring 104 cooperates with the fluid in the chamber 110 to move the element 102 axially in the direction of the arrow 102B, i.e., against the bias of the spring 105 in the housing 101 of the actuator 100 of FIG. 2.

Referring again to the gear shifting gate 10 of FIG. 1a, the actuator 100 of FIG. 2 can be caused to operate in such a way that, when the element 102 is caused to assume the predetermined axial position of FIG. 2, the transmission 140 can be shifted into or from the forward gear 3 or 4. If the pressure of fluid in the chamber 110 is reduced, i.e., if the element 102 is caused to move to its right-hand end position (namely in the direction of the arrow 102A and against the opposition of the coil spring 104), the member 160 can shift the transmission 140 into the forward gear 5 or into the reverse gear R. On the other hand, if the pressure of the fluid in the chamber 111 is caused or permitted to drop, the element 102 is moved in the direction which is indicated by the arrow 102B and the member 160 can shift the transmission 140 into or from the forward gear 1 or 2.

It is also possible to operate the actuator 100 of FIG. 2 in such a way that, if the motion transmitting element 102 is to move axially to the one or the other end position (i.e., from the predetermined position shown in FIG. 2), the fluid pressure varying means 117, 118, 120, 122, 123 can be operated (in response to signals from the control unit 130) to reduce the pressure of fluid in one of the chambers 110, 111 below atmospheric pressure while the pressure in the other chamber equals or approximates the atmospheric pressure or vice versa. Still further, it is equally possible to continuously maintain the fluid in one of the chambers 110, 111 at or close to atmospheric pressure and to vary the pressure of fluid in the other chamber to a value above or below atmospheric pressure. All that counts is to establish the required pressure differentials in order to maintain the motion transmitting element 102 in a desired axial position.

Figure 3:
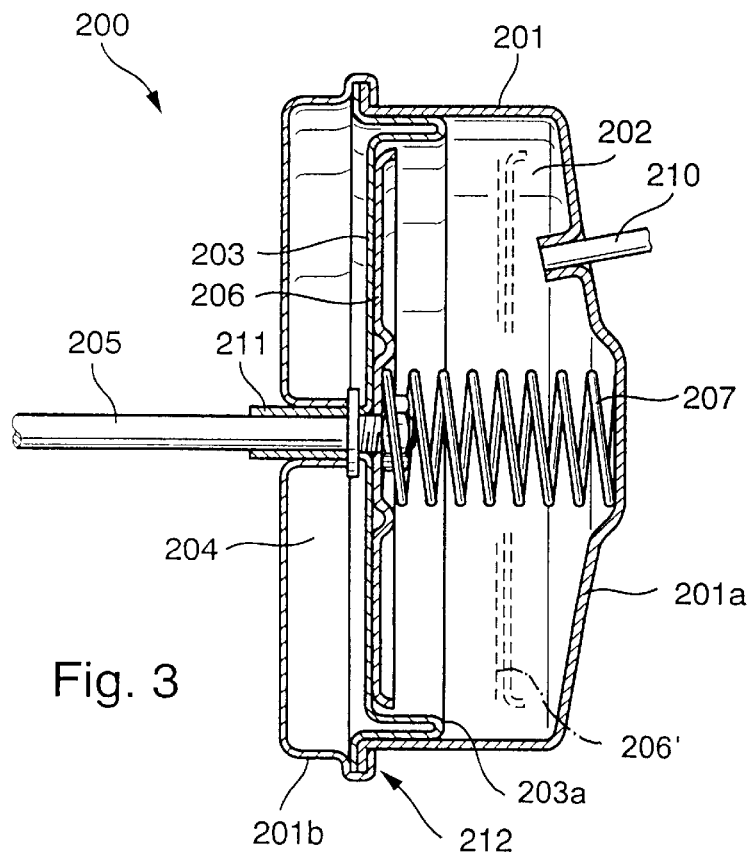
FIG. 3 is a sectional view of an actuator constituting a modification of the actuator which is shown in FIG. 2.

FIG. 3 shows a modified actuator 200 having a reciprocable motion transmitting element 205 adapted to be coupled to the gear selecting and shifting member 160 of the automated transmission 140 in lieu of the element 102 forming part of the aforedescribed actuator 100. The actuator 200 comprises a box-shaped metallic or plastic housing or casing 201 receiving an elastic diaphragm 203 which divides the interior of the housing into a first chamber 202 and a second chamber 204. The latter communicates with the surrounding atmosphere so that the pressure therein matches atmospheric pressure. Otherwise stated, the pressure of fluid in the chamber 204 is constant. The chamber 202 is bounded by the diaphragm 203 and by the section or wall 201a of the housing 201.

The illustrated diaphragm 203 is a so-called cup seal in that it comprises an annular radially outer marginal portion which is folded over itself so that it permits a pronounced axial movement of the motion transmitting element 205 through a cylindrical bearing sleeve 211 in the central portion of a housing section or wall 201b and toward the central portion of the housing section or wall 201a. The radially outwardly extending radially outermost portion of the diaphragm 203 is sealingly clamped in a junction 212 between the sections or walls 201a, 201b of the housing 201.

The radially innermost portion of the diaphragm 203 is affixed to the motion transmitting element 205, and that side of this diaphragm which confronts the chamber 202 abuts a rigid radially extending supporting member or partition 206 on the right-hand end portion of the element 205. The supporting member 206 is rigid, and its left-hand side can be bonded or otherwise affixed to that portion of the diaphragm 203 which is located radially inwardly of the folded-over radially outer portion of the member 203.

The energy storing means of the actuator 200 comprises a coil spring 207 which is installed in the chamber 202 to react against the central portion of the housing section or wall 201a and to bear against the central portion of the supporting member 206. FIG. 3 shows the element 205 in its left-hand end position in which the element 205 is held by the spring 207 and which is defined by the cylindrical bearing sleeve 211 and the supporting member 206.

The reference character 210 denotes a conduit corresponding to the conduit 217 and serving to connect the chamber 202 with a fluid pressurizing or suction generating device (corresponding to the device 120 shown in FIG. 2). If the valve (not shown) in the conduit 210 is opened in response to a signal from the control unit (such as the control unit 130 of FIG. 2), the folded radially outer portion of the diaphragm 203 enables the supporting member 206 and the element 205 to move axially to the right (as viewed in FIG. 3) so that the volume of the chamber 202 is reduced accordingly and the spring 207 stores energy (or additional energy). The right-hand end position of the supporting member 206 is shown by broken lines, as at 206', and such end position corresponds to the right-hand end position of the motion transmitting element 205.

The junction 212 can be formed as a result of appropriate deformation of the housing sections 201a, 201b to establish between such sections a bell-and-spigot joint or an analogous or another suitable joint which maintains these sections in sealing engagement with each other and with the radially outermost portion of the elastic diaphragm 203.

When the actuator 200 of FIG. 3 permits the diaphragm 203 and the motion transmitting element 205 to assume one of their end positions, the gear selecting and shifting member (such as 160) which receives motion from the element 205 can shift the transmission (such as 140) into the gear 1 or 2 (reference should be had again to FIG. 1a). In order to shift into the gear 5 or R of FIG. 1a, the element 205 and/or the member 160 must bypass an obstacle (to be described with reference to FIGS. 4a–4d and FIG. 5a–5b) which cannot be bypassed when the transmission is to be shifted into the gear 3 or 4. The obstacle of FIGS. 4a–4d is a projection 311 provided on an indexible shaft 302 which latter can assume an angular position (FIG. 4d) in which the projection 311 can be bypassed by a projection 310 on a reciprocable and indexible motion transmitting element 301 corresponding to the element 205 or to the member 160.

FIGS. 4a to 4d illustrate but one of numerous possible modes of selectively permitting or preventing the movement of the element 205 or an analogous motion transmitting element all the way between two spaced-apart end positions.

Figure 3A:
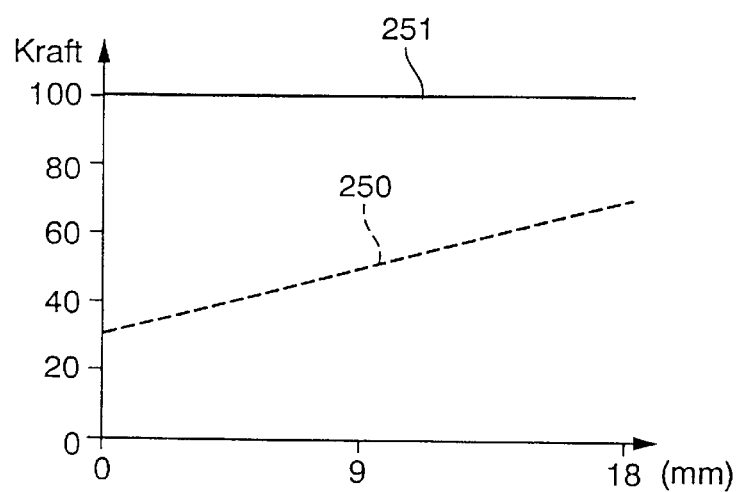
FIG. 3a is a coordinate system wherein the curves denote the relationship between the bias of a spring and the pressure in a chamber of the actuator which is shown in FIG. 3.

In the coordinate system of FIG. 3a, the forces acting upon the element 205 of FIG. 3 are measured along the ordinate, and the distances covered by the element 205 are measured along the abscissa. The broken straight line 250 denotes the magnitude of the increasing force which is furnished by the coil spring 207 in response to a movement of the supporting member 206 from the solid-line end position to the broken-line end position 206' of FIG. 3. The relationship between the distance covered by the supporting member 206 and the diaphragm 203 on the one hand, and the bias of the spring 207 on the other hand, is a linear relationship (note the straight horizontal curve 251). FIG. 3a further shows that the effect of suction (curve 251) in the chamber 202 upon the diaphragm 203 is constant, i.e., suction is not dependent upon the extent of axial movement of the diaphragm 203.

FIGS. 4a to 4d show a reciprocable gear selecting and shifting member 301 including a radially outwardly extending projection 310 having a predetermined width as measured in the, directions (denoted by a double-headed arrow 301A) of reciprocatory movement of the member 301. The latter is parallel to an elongated reciprocable and indexible (turnable) motion transmitting and movement limiting element 302 which is rotatably and axially movably mounted in suitable bearings 307, 308 and is movable axially between two end positions 303, 304 determined by suitable stops 306, 305 (e.g., in the form of rubber cups).

Figure 4A:
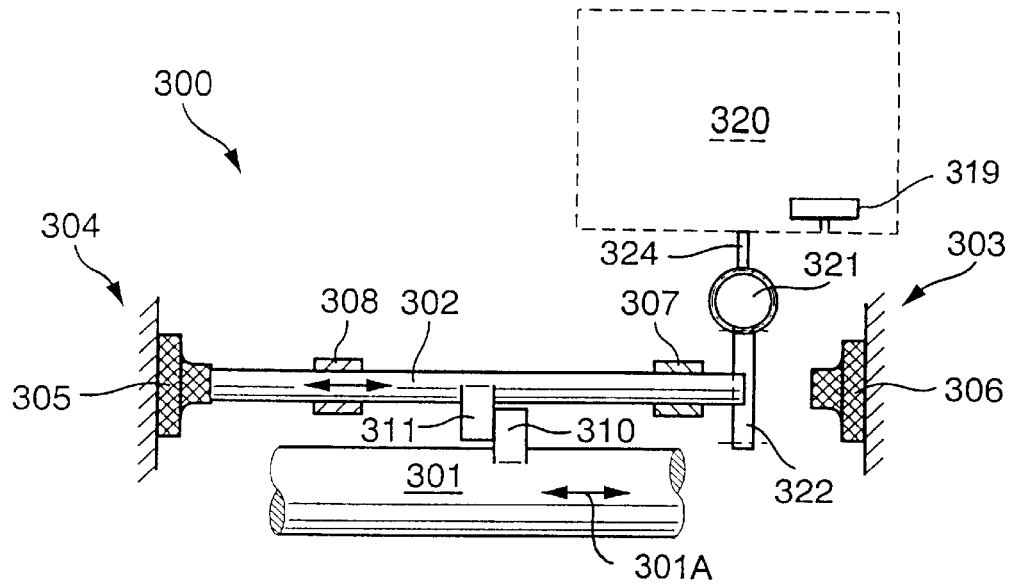
FIG. 4a is a fragmentary partly elevational and partly schematic view of a portion of an automated transmission wherein the gear selecting and shifting member is movable axially between several positions in a novel and improved way, such member being shown in an intermediate position following a movement from one of its end positions.

The means for indexing the element 302 about its axis comprises an actuator 320 which can include an electric motor, a suitable magnetic actuator 319 or a fluid-operated motor (e.g., a suction box or another suitable suction generating device) serving to index the element 302 by way of one or more gearings. FIG. 4a shows, by way of example, the rotary output shaft 324 of an electric motor serving to rotate a first gear 321. The gear 321 meshes with a second gear 322 which is non-rotatably but axially movably secured to the element 302.

The member 301 can correspond to the element 205 of FIG. 3, to the element 102 of FIG. 2, or to the member 160 of FIG. 2, i.e., it is designed to shift an automated transmission (such as 140) into or from a selected gear. This member 301 has two end positions (for shifting into the gears 1, 2 or 5, R of FIG. 1a). The combined width of the projections 310, 311 (as measured in the directions indicated by the double-headed arrow 301A) equals the maximum distance which the element 302 can cover between its end positions 303, 304, i.e., the maximum extent of movement permitted by the stops 306, 305.

Figure 4B:
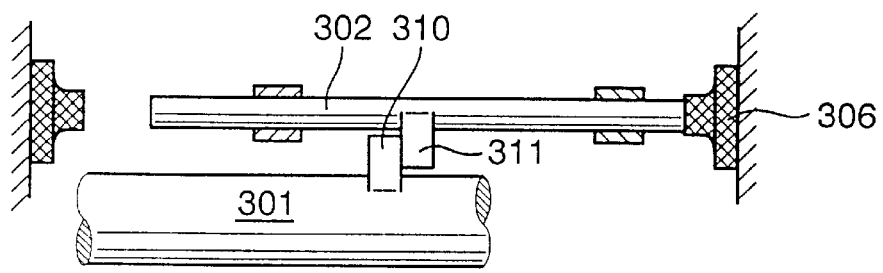
FIG. 4b shows certain parts of the structure of FIG. 4a, with the gear selecting and shifting member of the automated transmission again in the intermediate position but subsequent to a movement from the other end position.
Figure 4C:
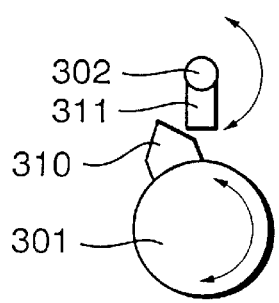
FIG. 4c is an end elevational view of certain parts of the structure which is shown in FIGS. 4a and 4b but with the gear selecting and shifting member indexed to maintain the transmission in a selected gear.
Figure 4D:
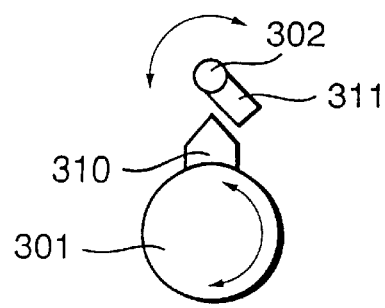
FIG. 4d shows the structure of FIG. 4c but with the element which serves to arrest the gear selecting and shifting member shown in an angular position out of the way to thus permit axial movements of the gear selecting and shifting member all the way between its end positions.

As shown in FIGS. 4c and 4d, the element 302 can be indexed (turned) from a first angular position (FIG. 4c) to a second angular position (FIG. 4d) in which latter position its projection 311 can be bypassed by the projection 310 of the member 301 so that the latter can be moved all the way between its two end positions for shifting a transmission into the gear 1 or 2 or into the gear 5 or R (reference should be had again to FIG. 1a). However, if the element 302 is indexed to an angular position (shown in FIGS. 4a and 4b) in which the projection 311 is located in the path of movement of the projection 310, the member 301 is automatically arrested in the appropriate intermediate position (for shifting the transmission into the gear 3 or 4) regardless of whether the member 301 is being moved (e.g., by the element 205) from one end position toward the other end position or vice versa. This is attributable to the feature that the element 302 is free to move axially (under the action of the projection 310) between the two stops 305, 306 through a distance at least approximating the combined width of the projections 310 and 311 (as measured in the directions indicated by the double-headed arrow 301A).

FIG. 4a shows the member 301 in the intermediate position subsequent to movement from the right-hand end position, i.e., the projection 311 is located in the path of the projection 310 and the latter has shifted the element 302 to the left-hand end position 304 in which the element 302 abuts the resilient stop 305.

FIG. 4b shows the projection 311 in the path of the projection 310; however, the member 301 has been advanced from its left-hand end position, and the projection 310 has pushed the element 302 all the way to the right-hand end position 303 in which the element 302 abuts the resilient stop 306. It will be seen that the axial (intermediate) position of the member 301 is the same as in FIG. 4a because each of the FIGS. 4a and 4b shows the member 301 in the same intermediate position (in which the member 301 can shift the transmission into the forward gear 3 or 4, see FIG. 1a).

FIG. 4c shows the indexing of the member 301 about its axis in order to shift into one of the gears 1, 2, into one of the gears 3, 4, or into one of the gears 5, R, depending on the selected axial position of the member 301. The angular position of the element 302 and of its projection 311 is the same as in FIG. 4a or 4b. The indexing of the member 301 can be used solely to shift the transmission into or from a selected gear; alternatively, such indexing of the member 301 can replace the indexing of the element 302 or can be resorted to in addition to indexing of the element 302 to thus ensure that the member 301 can move between two end positions and a predetermined intermediate position regardless of whether the member 301 is being moved from one end position toward the other end position, or vice versa.

FIG. 4d shows the element 302 in that angular position in which the projection 310 can bypass the projection 311, at least when the member 301 is maintained in the angular position of FIG. 4a or 4b. As already mentioned above, the means for indexing the element 302 comprises the actuator 320 which can include an electric motor and a gearing between the output element of such motor and the element 302.

The means for indexing the member 301 between the angular positions of FIGS. 4c and 4d is not shown in the drawings; for example, such indexing means can be part of the actuator 7 shown in FIG. 1. The actuator 7 can move the member 301 axially and can also index the member 301 between the angular positions which are shown in FIGS. 4c and 4d.

Figure 5A:
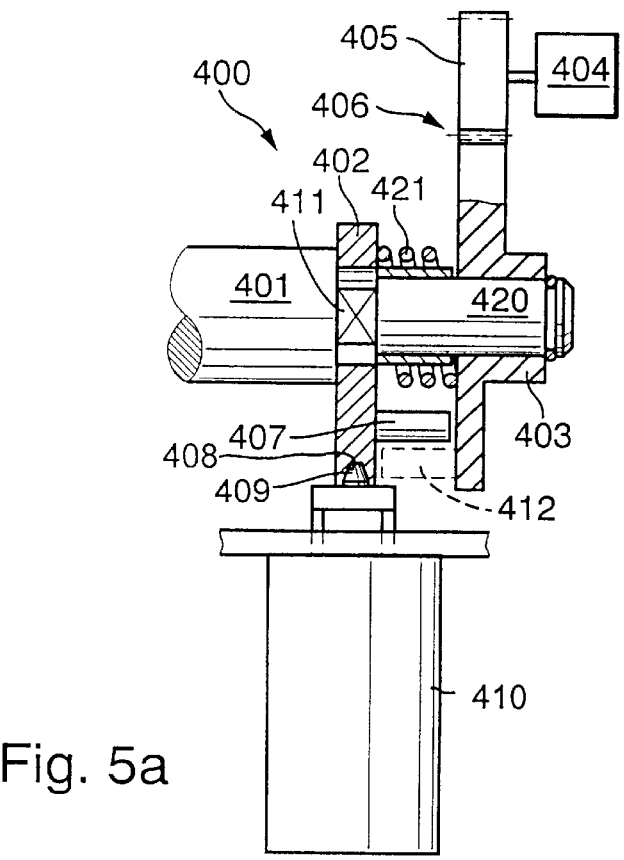
FIG. 5a is a partly elevational and partly sectional view of a novel mechanism for indexing the gear selecting and shifting member of the improved automated transmission.
Figure 5B:
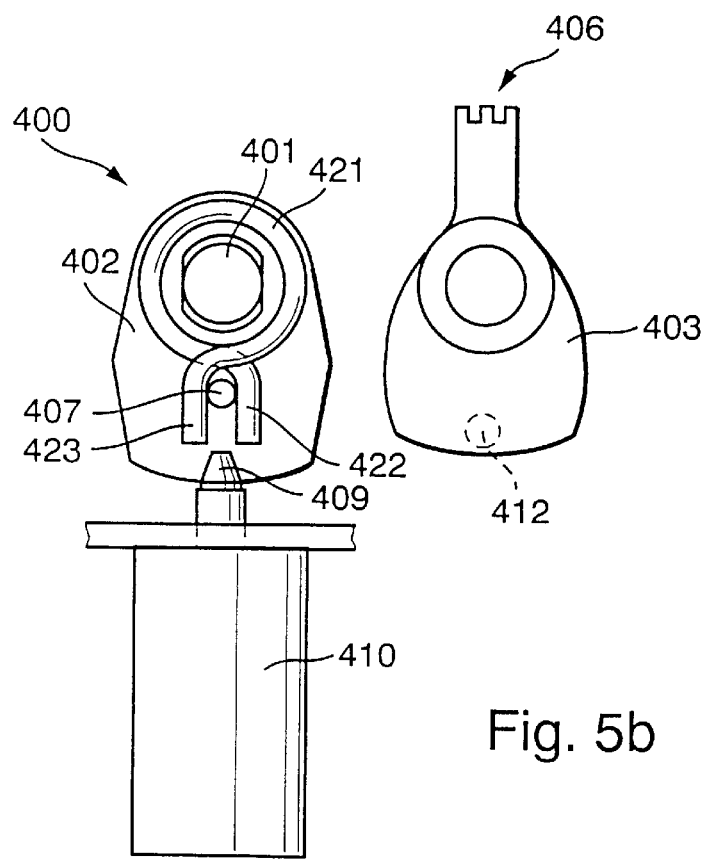

FIGS. 5a and 5b show an arrangement or apparatus 400 for indexing a gear selecting and shifting member 401 for an automated transmission (not shown in FIGS. 5a and 5b). The member 401 is shown in the form of a shaft or rod which can assume several different angular positions and can be locked in such positions by an actuator 410, e.g., an actuator employing an electric hoisting or lifting magnet or an electric motor. The connection between the member 401 and one or more internal gear selecting and/or shifting components of the transmission including the member 401 has been omitted for the sake of clarity. By way of example only, and depending upon the design of the transmission, the member 401 can be indexed between three or more different angular positions. The number of such angular positions depends upon the total number of ratios, as well as upon the number of different angular positions which the member 401 (or one or more internal components of the automated transmission) must assume in order to ensure that the transmission can be shifted into and from each and every gear.

The member 401 is non-rotatably (separably or inseparably) coupled with a plate-like first indexing element 402; for example, the indexing element 402 can be of one piece with the member 401. Alternatively, the element 402 can be provided with an internal gear which mates with an externally splined or toothed portion of the member 401. The element 402 is provided with a stud- or pin-shaped projection or extension 407 which is preferably parallel or substantially parallel with the axis of the member 401 and is located at a first radial distance from such axis. The periphery of the element 402 is provided with a set of recesses 408 which can be said to constitute first (female) locking devices and each of which can removably receive a tooth-shaped male locking device 409 movable radially of the axis of the member 401 by the aforementioned magnet of the actuator 410. For example, the element 402 can be provided with four female locking devices or recesses 408 if the member 401 is to be releasably locked in four different angular positions.

The apparatus or arrangement 400 further comprises a second plate-like indexing element 403 which is indexible with and relative to the element 402 about the axis of the member 401. A bearing 411 is provided to rotatably mount a shaft 420 for the element 403 in the adjacent end portion of the member 401, and an actuator 404 serves to turn the shaft 420 and the element 403 about the axis of the element 401. The actuator 404 comprises an electric motor or another suitable device adapted to rotate a first gear 405 forming part of a gearing and mating with a gear segment 406 at the periphery of the element 403.

The indexing element 403 also comprises an extension 412 (e.g., a pin or a stud) which is parallel to the axis of the member 401 and is located at a greater radial distance from such axis than the extension 407 of the indexing element 402. It is also possible to locate the extension 412 at a lesser first radial distance and the extension 407 at a greater second radial distance from the axis of he member 401. Still further, the extensions 407 and 412 can be located at the same radial distance from the axis of the member 401.

An energy storing device including a coil spring 421 is provided to bias the indexing elements 402, 403 to predetermined angular positions relative to each other. The convolutions of the illustrated coil spring 421 surround the shaft 420 of the indexing element 403 (i.e., such convolutions surround the axis of the member 401), and the two end portions 422, 423 of the spring 421 flank the axially parallel extensions 407, 412 to thus urge the elements 402, 403 to the aforementioned predetermined angular positions relative to each other. The spring 421 is caused to store energy (or additional energy) if one of the elements 402, 403 is caused to turn relative to the other of these elements (e.g., if the actuator 404 receives a signal from a control unit to turn the indexing element 403).

The end portions 422, 423 of the coil spring 421 can extend substantially radially of the axis of the member 401.

If the male locking device 409 is disengaged (withdrawn) from the adjacent female locking device 408, the motor of the actuator 404 can cause the gearing 405, 406 to turn the element 403 and its extension 412 whereby the latter acts upon the end portion 422 or 423 of the spring 421 to thus ensure that the resulting angular displacement of the member 401 at least approximates the angular displacement of the indexing element 403.

If the transmission including the member 401 is in gear, the member 401 cannot turn with the element 403. Thus, if the actuator 404 is operated to index the element 403 while the element 402 and the member 401 are held against rotation, the spring 421 stores an increasingly growing amount of energy. A different gear can be selected as soon as the transmission including or cooperating with the member 401 is shifted into neutral because the element 402 is then indexible by the element 403 by way of the coil spring 421. The actuator 410 can thereupon ensure that the male locking device 409 enters the adjacent female locking device 408 to thus arrest the member 401 in the newly selected angular position.

Each patent and/or patent application which is mentioned in this specification is incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of automated transmissions for use in the power trains of motor vehicles and, therefore, such adaptations should and are intended to be comprehended within the meaning and range of equivalence of the appended claims.

What is claimed is:

1. Apparatus for operating a mobile condition-changing member of an automated transmission, comprising at least one actuator arranged to move said member in response to signals from a control unit, said at least one actuator comprising a motion transmitting element operatively connected with said member and movable back and forth along a predetermined path; energy storing means for biasing said element to at least one predetermined position in which said member causes the transmission to assume a first condition; and fluid-operated means for moving said element from said predetermined position to at least one second position in which said member causes the transmission to assume a second condition, said fluid-operated means comprising at least one fluid-containing chamber and means for varying the pressure of fluid in said chamber to thus effect a movement of said element to said at least one second position, wherein said at least one chamber is an annular chamber surrounding a spring of said energy storing means.

2. The apparatus of claim 1, wherein said path is an at least substantially straight path and said energy storing means comprises at least one resilient energy storing component.

3. The apparatus of claim 1, wherein said energy storing means comprises at least one energy storing component and said at least one chamber is a plenum chamber.

4. The apparatus of claim 1, wherein the transmission is shiftable into a selected one of a plurality of different gears and said condition-changing member is arranged to carry out at least one of condition changing operations including (a) selecting a gear and (b) shifting into and from a selected gear.

5. The apparatus of claim 1, wherein said element is movable along said path between two end positions.

6. The apparatus of claim 5, wherein said energy storing means is arranged to bias said element to one of said end positions.

7. The apparatus of claim 6, wherein said one end position is said predetermined position.

8. The apparatus of claim 5, wherein said predetermined position is located between said end positions and said energy storing means comprises at least one first and at least one second spring, said springs being arranged to apply to said element forces which at least substantially neutralize each other in said predetermined position of said element.

9. The apparatus of claim 1, wherein said fluid-operated means comprises a first and a second fluid-containing chamber and means for regulating the pressure of fluid in at least one of said first and second chambers to thus effect a movement of said element to a selected one of a plurality of second positions.

10. The apparatus of claim 9, wherein said fluid-operated means is operative to effect a movement of said element from said predetermined position along said path in a first direction against the opposition of said energy storing means and of fluid in said second chamber in response to a rise of fluid pressure in said first chamber and to effect a movement of said element from said predetermined position along said path in a second direction against the opposition of said energy storing means and of fluid in said first chamber in response to a rise of fluid pressure in said second chamber.

11. The apparatus of claim 10, wherein said fluid-operated means further comprises a displaceable partition sealing said first and second chambers from each other and connected with said motion transmitting element.

12. The apparatus of claim 11, wherein said partition includes a deformable diaphragm.

13. The apparatus of claim 10, wherein said fluid-operated means further comprises a displaceable sealing wall for each of said chambers, each of said walls having a portion secured to said motion transmitting element.

14. The apparatus of claim 13, wherein at least one of said walls includes a deformable diaphragm.

15. The apparatus of claim 9, wherein said pressure regulating means comprises at least one suction generating device and means for selectively connecting said at least one suction generating device with said chambers.

16. The apparatus of claim 9, wherein said pressure regulating means includes means for raising the pressure of fluid in at least one of said chambers above atmospheric pressure.

17. The apparatus of claim 9, wherein said pressure regulating means includes means for raising the pressure of fluid in one of said chambers above atmospheric pressure and means for lowering the pressure of fluid in the other of said chambers below atmospheric pressure.

18. The apparatus of claim 9, wherein said pressure regulating means includes means for at least temporarily maintaining the fluid in one of said chambers at atmospheric pressure and for at least temporarily maintaining the fluid in the other of said chambers at a pressure other than atmospheric pressure.

19. The apparatus of claim 9, wherein said pressure regulating means includes means for permanently maintaining the pressure of fluid in one of said chambers at least close to atmospheric pressure.

20. The apparatus of claim 9, wherein said fluid-operated means comprises a housing including first and second walls respectively bounding portions of said first and second chambers, at least one first diaphragm cooperating with said first wall to define said first chamber, and at least one second diaphragm cooperating with said second wall to define said second chamber.

21. The apparatus of claim 20, wherein said fluid-operated means further comprises first and second supporting members for said first and second diaphragms, each of said supporting members being operatively connected with said motion transmitting element.

22. The apparatus of claim 21, wherein said energy storing means comprises at least one spring provided in one of said chambers and bearing against the respective supporting member.

23. The apparatus of claim 9, wherein said fluid operated means further comprises a housing including a wall bounding a portion of said first chamber, at least one first diaphragm cooperating with said wall to define said first chamber, a second diaphragm bounding a portion of said second chamber, and a second wall borne by and received in said housing and cooperating with said second diaphragm to define said second chamber.

24. The apparatus of claim 9, wherein at least one of said chambers has an at least substantially dynamically balanced configuration.

25. The apparatus of claim 9, wherein at least one of said chambers has an at least substantially circular shape.

26. The apparatus of claim 9, wherein said energy storing means comprises at least one spring provided in one of said chambers and arranged to bias said motion transmitting element to said predetermined position.

27. A transmission shiftable into and from a selected one of a plurality of different gears, comprising a gear selecting and shifting member movable back and forth in a predetermined direction along a first path and including a first lateral projection having a first width, as measured in said direction; and means for moving said member along said first path, including a motion transmitting element movable back and forth along a second path, including a second lateral projection and being indexible between first and second angular positions, said second projection having a second width, as measured in said direction, and being aligned with said first projection in said first angular position of said element, and means for moving said element along said second path between two end positions, wherein the first projection serves as an end position for said element and wherein said angular position of said element is limited to an amount substantially equal to the combined first width and the second width of the respective projections.

28. The transmission of claim 27, further comprising means for indexing said element including an electric motor and at least one gearing operatively connecting said motor with said element.

29. The transmission of claim 27, further comprising means for indexing said element, said indexing means comprising at least one magnetic actuator.

30. The transmission of claim 29, wherein said means for indexing further comprises at least one gearing connecting said at least one magnetic actuator with said element.

31. The transmission of claim 27, further comprising means for indexing said element, said indexing means including a suction-operated actuator.

32. The transmission of claim 31, wherein said means for indexing further comprises at least one gearing connecting said actuator with said element.

33. The transmission of claim 27, further comprising at least one bearing rotatably supporting said element for movement along said second path.

34. The transmission of claim 27, further comprising means for confining said element to movements through said distance, said confining means comprises at least one resilient stop.

35. A transmission shiftable into and from a selected one of a plurality of different gears, comprising a gear selecting and shifting member, said member being indexible about a predetermined axis; and means for indexing said member, including a first indexing element movable from a first position to a plurality of different second positions; means for moving said first element between said positions, a second indexing element movable with said member, and resilient means arranged to subject said second indexing element to the action of an increasing force in response to movement of said first indexing element from said first position, wherein said resilient means comprises at least one torsion spring.

36. The transmission of claim 35, wherein said elements are turnable about a common axis.

37. The transmission of claim 35, wherein said means for moving said first element includes a motor.

38. The transmission of claim 37, wherein said motor is an electric motor.

39. The transmission of claim 35, wherein said elements are turnable about a common axis and said first and second elements respectively comprise first and second extensions at least substantially parallel to said common axis and biased by said resilient means.

40. The transmission of claim 39, wherein said resilient means comprises at least one convolution surrounding said common axis and first and second end portions respectively bearing upon said first and second extensions.

41. The transmission of claim 39, wherein said extensions are disposed at different distances from said common axis.

42. The transmission of claim 39, further comprising at least one bearing rotatably mounting at least one of said elements for angular movement with and relative to the other of said elements about said common axis.

43. The transmission of claim 35, wherein at least one of said elements comprises a plurality of first locking devices engageable with a second locking device in different positions of said at least one element.

44. The transmission of claim 43, further comprising an actuator for engaging said second locking device with and for disengaging said second locking device from a selected one of said first locking devices.

45. The transmission of claim 44, wherein said actuator comprises a magnet.

\* \* \* \* \*